US009342169B2

(12) United States Patent
Kohara

(10) Patent No.: US 9,342,169 B2
(45) Date of Patent: May 17, 2016

(54) TERMINAL DEVICE

(71) Applicant: SONY MOBILE COMMUNICATIONS INC., Minato-ku (JP)

(72) Inventor: Ichitaro Kohara, Kanagawa (JP)

(73) Assignees: Sony Corporation, Tokyo (JP); SONY MOBILE COMMUNICATIONS INC., Tokyo (JP)

(*) Notice: Subject to any disclaimer, the term of this patent is extended or adjusted under 35 U.S.C. 154(b) by 135 days.

(21) Appl. No.: 13/768,529

(22) Filed: Feb. 15, 2013

(65) Prior Publication Data

US 2013/0222251 A1 Aug. 29, 2013

Related U.S. Application Data

(60) Provisional application No. 61/604,023, filed on Feb. 28, 2012.

(51) Int. Cl.
| | |
|---|---|
| G09G 5/00 | (2006.01) |
| G06F 3/02 | (2006.01) |
| G06F 3/041 | (2006.01) |
| G06F 3/0488 | (2013.01) |

(52) U.S. Cl.
CPC ............ *G06F 3/041* (2013.01); *G06F 3/04883* (2013.01)

(58) Field of Classification Search
CPC .................. G06F 3/041–3/048; G06F 3/0237; G06F 3/0488; G06F 3/04886; G06F 3/04895; G06F 2203/04108

USPC ........................... 345/156–184; 715/862, 773
See application file for complete search history.

(56) References Cited

U.S. PATENT DOCUMENTS

| | | | | |
|---|---|---|---|---|
| 2004/0183833 | A1* | 9/2004 | Chua | 345/773 |
| 2004/0239649 | A1* | 12/2004 | Ludtke | 345/173 |
| 2006/0202866 | A1* | 9/2006 | Pathiyal | 341/22 |
| 2007/0040813 | A1* | 2/2007 | Kushler et al. | 345/173 |
| 2007/0074131 | A1* | 3/2007 | Assadollahi | G06F 3/0237 715/816 |
| 2007/0250650 | A1* | 10/2007 | Fux | 710/67 |
| 2009/0077464 | A1* | 3/2009 | Goldsmith et al. | 715/257 |
| 2010/0026723 | A1* | 2/2010 | Nishihara et al. | 345/671 |
| 2011/0310048 | A1* | 12/2011 | B.R et al. | 345/173 |
| 2012/0105331 | A1* | 5/2012 | Nomoto | 345/169 |

FOREIGN PATENT DOCUMENTS

JP 2009-151646 7/2009

* cited by examiner

*Primary Examiner* — Stephen Sherman
(74) *Attorney, Agent, or Firm* — Oblon, McClelland, Maier & Neustadt, L.L.P.

(57) ABSTRACT

An information processing apparatus that detects, by a touch panel disposed on or formed integrally with a display, a contact input and a contactless input of an object; determines a position corresponding to an input based on an output from the touch panel; detects a change in distance between a top surface of the touch panel and the object based on the output from the touch panel; and controls the display to display a candidate word list on the display based on the determined position and the detected change in distance.

20 Claims, 12 Drawing Sheets

TERMINAL DEVICE

CROSS REFERENCE TO RELATED APPLICATION

The present application claims the benefit of the earlier filing date of U.S. Provisional Patent Application Ser. No. 61/604,023 filed on Feb. 28, 2012, the entire contents of which is incorporated herein by reference.

BACKGROUND

1. Field of the Disclosure

The present disclosure relates to a terminal device that can be appropriately applied to a mobile phone terminal device including a touch panel.

2. Description of Related Art

In recent years, various types of mobile phone terminal devices referred to as smartphones have been commercialized. As for the smartphone, a terminal device includes a small number of operation keys and various operations are performed through the use of a touch panel integrated into a display panel. When a user performs the character input, for example, the display panel displays a character input keyboard. Then, the user touches a character on the displayed keyboard to input a desired character. The keyboard achieved through the display is referred to as a software keyboard.

In Japanese Unexamined Patent Application Publication No. 2009-151646, processing performed at the character input with a terminal device including a display unit with a touch panel is described. When a user inputs a character through a key operation, the terminal device displays plural conversion candidate words including the input character as the head characters. Then, the user performs an operation to select any word of the displayed plural conversion candidate words through a touch operation.

SUMMARY

Here, as for a terminal device such as the smartphone, the size of a display panel is limited due to the cabinet size of the terminal. Therefore, the display size defined to display a keyboard, a candidate word, etc. at the character input is small. For example, in the case of a keyboard to display many character keys, such as twenty-six letters of the alphabet, the display size of each key is significantly small. As a result, the size of each key of the displayed keyboard is narrower than the width of an operating finger. Therefore, when the finger of a user touches the top face of the display panel for operation, the finger entirely hides a displayed key, which easily causes an erroneous press of the key.

According to the terminal device described in Japanese Unexamined Patent Application Publication No. 2009-151646, when a displayed conversion candidate word is touched, the display area of the touched conversion candidate word is enlarged and displayed to avoid an erroneous press of a touch position, which occurs when a touch operation is performed on a display panel. However, an enlarged display of a conversion candidate word is not sufficient to avoid the erroneous press.

Further, since the displayed conversion candidate word is limited to a word estimated based on a character assigned to a single key touched with a finger, an appropriate conversion candidate word might not be displayed. That is, when the position of a touched key is adjacent to a key which is originally desired to be pressed, the display panel does not display a candidate word the user wishes to select. In that case, the user needs to perform an operation to cancel the pressed key and, in addition, to press the adjacent key, that is, significantly complicated operations are required.

The inventor recognizes the desirability to improve the input efficiency when the character input is performed through the use of a touch panel.

According to one exemplary embodiment, the disclosure is directed to an information processing apparatus including a display; a touch panel disposed on or formed integrally with the display that detects a contact input and a contactless input of an object; and a processing unit that determines a position corresponding to an input based on an output from the touch panel; detects a change in distance between a top surface of the touch panel and the object based on the output from the touch panel; and controls the display to display a candidate word list on the display based on the determined position and the detected change in distance.

According to another exemplary embodiment, the disclosure is directed to a method performed by an information processing apparatus, the method comprising: detecting, by a touch panel disposed on or formed integrally with a display, a contact input and a contactless input of an object; determining, by a processing unit, a position corresponding to an input based on an output from the touch panel; detecting, by the processing unit, a change in distance between a top surface of the touch panel and the object based on the output from the touch panel; and controlling, by the processing unit, the display to display a candidate word list on the display based on the determined position and the detected change in distance.

According to another exemplary embodiment, the disclosure is directed to a non-transitory computer-readable medium including computer program code, which when executed by an information processing apparatus, causes the information processing apparatus to perform a process, the process comprising: detecting, by a touch panel disposed on or formed integrally with a display, a contact input and a contactless input of an object; determining a position corresponding to an input based on an output from the touch panel; detecting a change in distance between a top surface of the touch panel and the object based on the output from the touch panel; and controlling the display to display a candidate word list on the display based on the determined position and the detected change in distance.

According to the present disclosure, a candidate word displayed as a candidate word list at the character input is an appropriate candidate word based on a position where a finger or an indicator approaches a touch panel and the approach distance. Consequently, a candidate word displayed on the display panel has a high possibility of being an appropriate candidate word, which allows the character input to be performed with efficiency.

DETAILED DESCRIPTION

Figure 1:
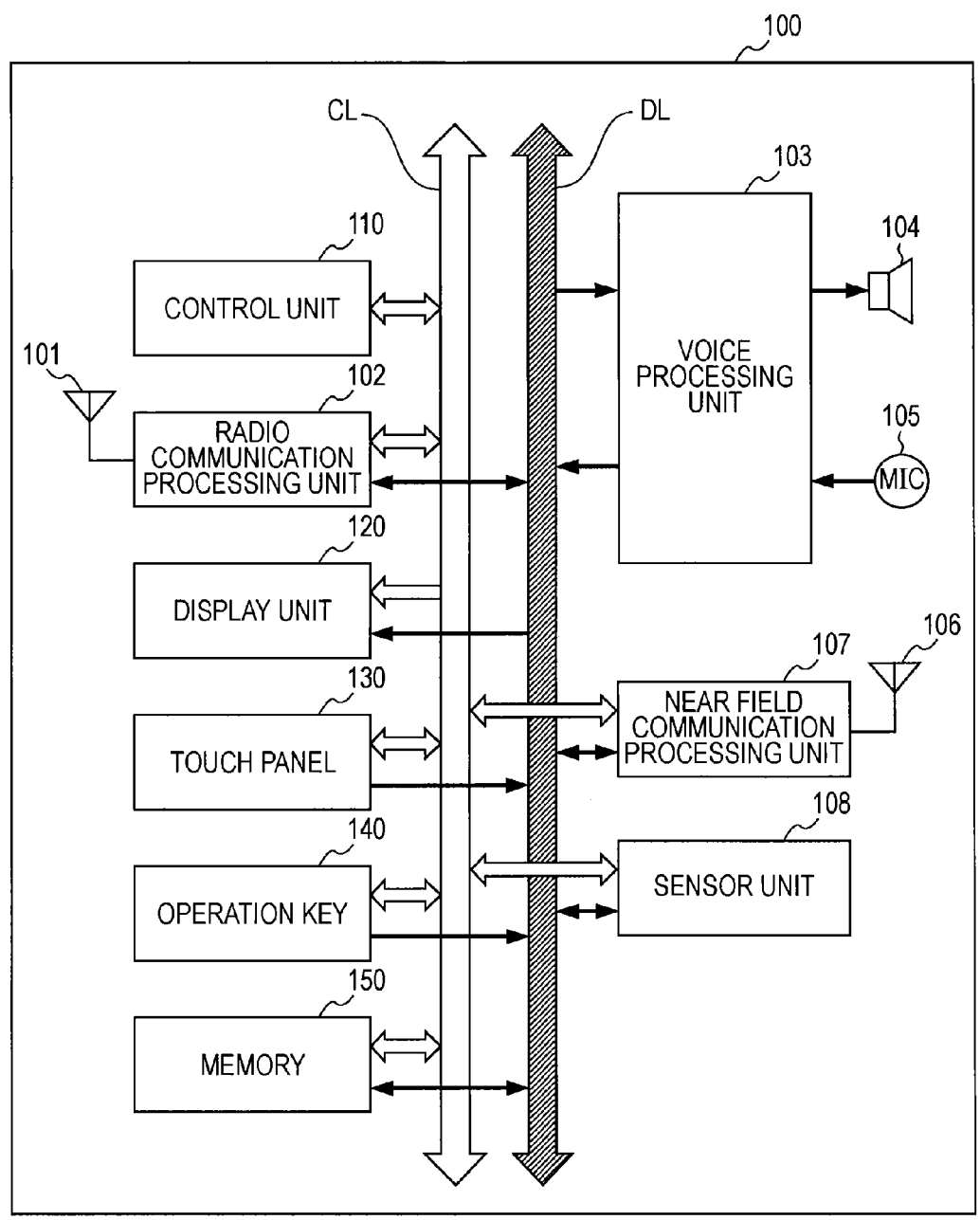
FIG. 1 is a block diagram illustrating an exemplary configuration of a terminal device according to an embodiment of the present disclosure.

Hereinafter, an example of a terminal device, a character input method, and a program according to an embodiment of the present disclosure will be described in the following order with reference to drawings.

1. Configuration of terminal device (FIG. 1 to FIG. 3)
2. Character input process (FIG. 4 and FIG. 5)
3. Exemplary specific input operations (FIG. 6 to FIG. 9)
4. Exemplary scrolling of word conversion candidate display (FIG. 10 and FIG. 11)
5. Exemplary determination of number of word conversion candidates (FIG. 12 to FIG. 13)
6. Exemplary word conversion candidate determined in accordance with text (FIG. 14)
7. Exemplary enlargement of specified character (FIG. 15)
8. Exemplary change in mode of displaying candidate character (FIG. 16)
9. Exemplary display of Japanese characters (FIG. 17 to FIG. 19)
10. Exemplary modifications

[1. Configuration of Terminal Device]

The configuration of a mobile phone terminal device 100 will be described with reference to FIG. 1.

The mobile phone terminal device 100 includes an antenna 101 provided to perform radio communication with a base station for a radio telephone. The antenna 101 is connected to a radio communication processing unit 102. The radio communication processing unit 102 performs processing of transmitting and receiving a radio signal under control of a control unit 110. The control unit 110 sends a control instruction to the radio communication processing unit 102 via a control line CL. The control unit 110 reads a program (software) stored in a memory 150 via the control line CL, and controls each unit of the mobile phone terminal device 100 through execution of the program. The memory 150 included in the mobile phone terminal device 100 stores data prepared in advance including a program, and data generated based on a user operation. The memory 150 stores and reads data under control of the control unit 110. Data stored in the memory 150 includes data to be used to perform the character input which will be described later.

During a voice conversation, conversation voice data received with the radio communication processing unit 102 is supplied to a voice processing unit 103 via a data line DL. The voice processing unit 103 performs demodulation processing for the supplied voice data, and obtains an analog voice signal. The analog voice signal obtained with the voice processing unit 103 is supplied to a speaker 104. The speaker 104 outputs a voice.

Further, during a voice conversation, the voice processing unit 103 converts a voice signal output from a microphone 105 into voice data in a transmission format. Then, the voice data converted with the voice processing unit 103 is supplied to the radio communication processing unit 102 via the data line DL. The voice data supplied to the radio communication processing unit 102 is packetized and transmitted by radio.

When performing data communications and the transmission/reception of mail via a network including the Internet, the radio communication processing unit 102 performs processing including transmission and reception under control of the control unit 110. For example, data received with the radio communication processing unit 102 is stored in the memory 150, and processing including display performed based on the stored data is performed through control of the control unit 110. Further, the data stored in the memory 150 is supplied to the radio communication processing unit 102, and transmitted by radio.

The mobile phone terminal device 100 includes a display unit 120. The display unit 120 includes a display panel 121 (FIG. 2) performing display of an image and various information. As the display panel 121, for example, a liquid crystal display panel or an organic EL (Electro-Luminescence) display panel are used.

Further, the mobile phone terminal device 100 includes a touch panel unit 130. When the top face of the display panel 121 is touched with an object including a finger, a pen, etc., the touch panel unit 130 detects the touched position. The touch panel unit 130 not only detects the touched position, but also detects the near distance from the top face of the display panel 121 to the object including the finger. The near distance in the range of about a few cm from the top face of the display panel 121 can be detected. Data on the touched position and the near distance that are detected with the touch panel unit 130 is sent to the control unit 110.

Further, the mobile phone terminal device 100 includes an operation key 140. Information on an operation of the operation key 140 is sent to the control unit 110. Here, most operations of the mobile phone terminal device 100 are performed through a touch panel operation performed using the touch panel unit 130. The operation key 140 only performs some of operations.

Further, the mobile phone terminal device 100 includes a near field communication processing unit 107 to which an antenna 106 is connected. The near field communication processing unit 107 performs near field communication with a nearby terminal device or access point. The near field communication processing unit 107 performs radio communication with a device which is in a range of about several ten m by applying a wireless LAN system defined as the IEEE802.11 standard, a system referred to as Bluetooth (trademark), and so forth.

Further, the mobile phone terminal device 100 includes a sensor unit 108. The sensor unit 108 includes a sensor detecting the movement and direction of a device, such as an acceleration sensor, a magnetic field sensor, etc., and a sensor detecting the circumstances surrounding a device, such as a proximity sensor.

Figure 2:
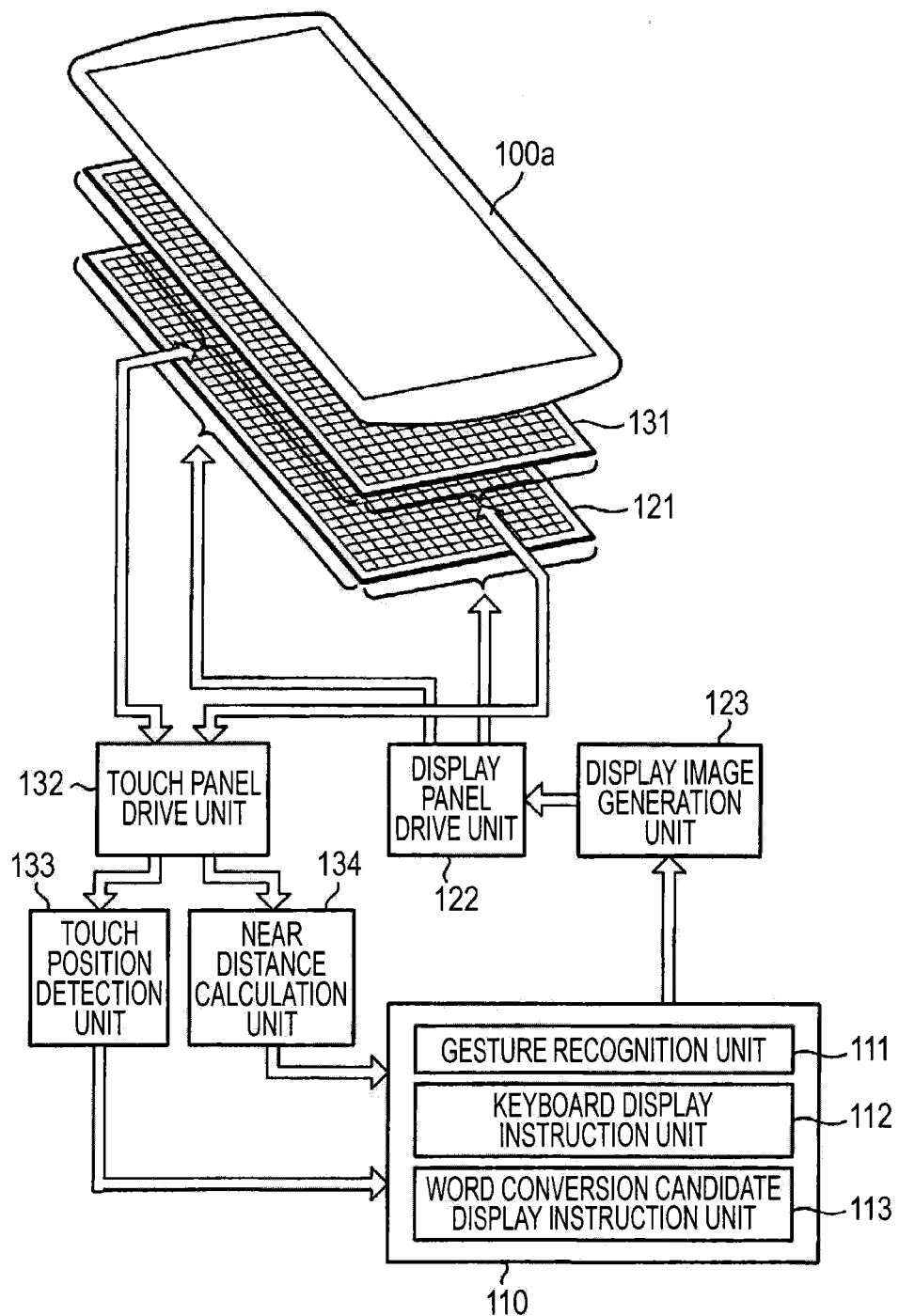
FIG. 2 is a block diagram illustrating an exemplary configuration of display and touch detection of a terminal device according to an embodiment of the present disclosure.

FIG. 2 illustrates the configurations of the display unit 120 and the touch panel unit 130.

As illustrated in FIG. 2, the display unit 120 includes a display panel 121 performing image display. The touch panel 131 is provided on the display panel 121. Further, a protective cover 100a is provided on the touch panel 131. These display panel 121, touch panel 131, and protective cover 100a are bonded together into a single body. The display panel 121 and the touch panel 131 may be integrally formed.

Note that, according to touch panel operations described below, the touch panel unit 130 detects a touch of the top face of the display panel or the touch panel, which precisely means a touch of the top face of the protective cover 100a.

Display is performed on the display panel 121 based on an instruction from the control unit 110. That is, the display unit 120 includes a display image generation unit 123, and a display instruction is transmitted from the control unit 110 to the display image generation unit 123. During the character input that will be described later, display is also performed on the display panel 121 based on a display instruction transmitted from the control unit 110 to the display image generation unit 123.

The data on a display image generated with the display image generation unit 123 is supplied to a display panel drive unit 122. The display panel drive unit 122 drives display performed with the display panel 121 based on the display image data supplied from the display image generation unit 123. The display panel 121 has display drive lines including transparent electrodes, which extend in a vertical direction and a horizontal direction, for example, and has switching elements controlling display performed with individual pixels at intersection points of the display drive lines in the vertical direction and the display drive lines in the horizontal direction. Then, signals supplied from the display panel drive unit 122 to the individual display drive lines turn on/off the switching elements of the pixels, so that the display statuses of the individual pixels provided in the display panel 121 are determined.

The touch panel 131 detects a change in capacitance, which occurs when the top face of the protective cover 100a is touched. For detecting the capacitance change, the touch panel 131 includes lines of conductive film in a vertical direction and a horizontal direction. For example, the lines of conductive film extending in the vertical direction are provided on the top face of the touch panel 131, and the lines of conductive film extending in the horizontal direction are provided on the back face of the touch panel 131. Then, the touch panel drive unit 132 periodically detects the capacitance changes at individual intersection points of the conductive films.

A touch position detection unit 133 and a near distance calculation unit 134 are connected to the touch panel drive unit 132. The touch position detection unit 133 calculates the center position of an area where the capacitance is changed to detect a touch position. Note that, the touch position detected with the touch position detection unit 133 includes an approached position where an object including a finger is not in contact with the display panel 121. In the case where the object including the finger is not in contact with the display panel 121, a position at the top face of the display panel 121 nearest from the end of an approached object represents the touch position.

The near distance calculation unit 134 calculates the distance from the end of the approached object to the top face of the touch panel 131 based on the peak value of a detected capacitance, etc. However, a distance that can be calculated with the near distance calculation unit 134 is a short distance obtained when the object approaches to the extent that the touch position detection unit 133 can detect a touch position, that is, a distance of about a few cm.

Data on the touch position detected with the touch position detection unit 133 and data on an approach distance calculated with the near distance calculation unit 134 are supplied to the control unit 110.

The control unit 110 includes a gesture recognition unit 111, a keyboard display instruction unit 112, and a word conversion candidate display instruction unit 113 as processing units that are used to perform the character input. The gesture recognition unit 111 recognizes that there are operations corresponding to specified gestures that are registered in advance based on a change in the status of the touch position detected with the touch position detection unit 133. The keyboard display instruction unit 112 instructs the display panel 121 to display a software keyboard. The word conversion candidate display instruction unit 113 instructs the display panel 121 to display word conversion candidates. As for the word conversion candidates, a word with an estimated high possibility of being input, and a word with an estimated high input frequency based on the past input history, are determined to be conversion candidates for each character prepared in advance. Data used to determine the conversion candidates is stored in the memory 150.

Figure 3:
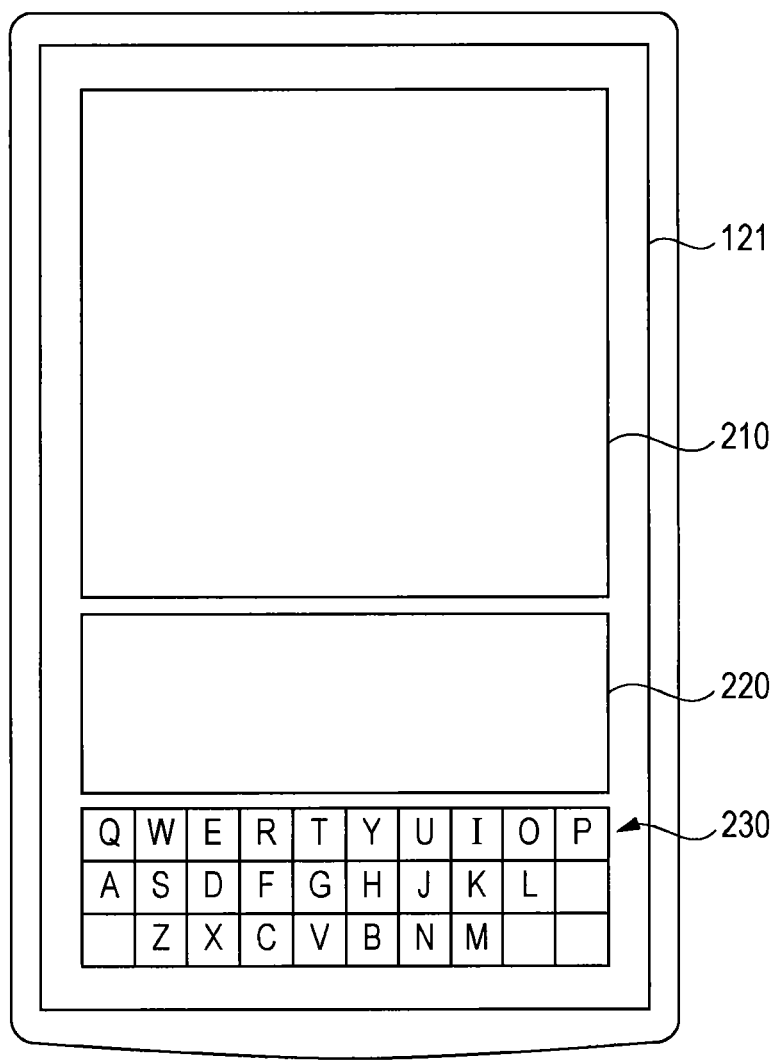
FIG. 3 is a plan view illustrating exemplary settings on a display area according to an embodiment of the present disclosure.

FIG. 3 is a diagram illustrating an exemplary screen of the display panel 121, when the mobile phone terminal device 100 performs the character input. At the character input, the display panel 121 displays a text display area 210, a word conversion candidate display area 220, and a software keyboard display area 230.

The text display area 210 displays text with its input being determined. The word conversion candidate display area 220 displays a list of conversion candidate words. The software keyboard display area 230 displays a keyboard including rows of characters that can be input. As illustrated in FIG. 3, the software keyboard display area 230 displays 26 keys including 26 letters of the alphabet, for example. Keys of numerics, signs, etc. may be simultaneously displayed.

Then, when the touch panel unit 130 detects a touch of the display position of any key while the software keyboard display area 230 displays the keyboard, the control unit 110 determines that an input operation of the corresponding key is performed. When an input operation is performed with the keyboard, the word conversion candidate display instruction unit 113 of the control unit 110 reads a conversion candidate word including a character assigned to the operated key as the head character from the memory 150. Then, the word conversion candidate display instruction unit 113 displays the read conversion candidate word list on the word conversion candidate display area 220. However, when the gesture recognition unit 111 included in the control unit 110 detects an input operation of a specified gesture based on a change in an approached position or a contact position in the state where an object including a finger has approached or come in contact with the display panel 121, the conversion candidate word list displayed on the word conversion candidate display area 220 is scrolled. Examples of the gesture recognized with the gesture recognition unit 111 will be described later.

Further, when any of words of the candidate word list displayed on the word conversion candidate display area 220 is selected through a touch operation, the selected word is determined to be a conversion word. After being determined to be the conversion word, the determined word is displayed at the end of text which is currently displayed on the text display area 210. Further, when a word is selected from the word conversion candidate display area 220, the control unit 110 stores the history of the selected word in the memory 150.

[2. Character Input Process]

Next, an exemplary process performed when the character input is conducted with the mobile phone terminal device 100 will be described in accordance with the flowcharts of FIG. 4 and FIG. 5.

When the mobile phone terminal device 100 performs a character input operation, the display panel 121 performs display of the text display area 210, the word conversion candidate display area 220, and the software keyboard area 230 that are illustrated in FIG. 3. Then, the user conducts the character input by performing a touch operation on the touch panel 131 in the state where the display is being performed. The flowchart of FIG. 4 describes control operations that are performed with the control unit 110 of the mobile phone terminal device 100 at the character input.

First, the control unit 110 determines whether or not the touch panel unit 130 has detected an approach of or contact with the object including the finger based on information transmitted from the touch position detection unit 133 and the near distance calculation unit 134 (step S11). When the approach of or contact with the object is not detected through the determination, the control unit 110 waits until the approach or the contact is detected.

Then, when the touch panel unit 130 detects the approach of or contact with the object, the control unit 110 determines the approach distance based on information transmitted from the near distance calculation unit 134, and determines the touch position based on information transmitted from the touch position detection unit 133 (step S12). Upon determining the touch position and the approach distance, the control unit 110 determines a key nearest to the touch position and a peripheral key in the software keyboard display area 230 (step S13). A peripheral key described here is a key having a high possibility of being subjected to a touch operation performed by a user, which is determined based on the touch position and the approach distance. Therefore, the control unit 110 does not select a key of which a possibility of being subjected to a touch operation performed by the user is determined to be low based on the touch position and the approach distance, as a peripheral key, even though the key is adjacent to a key nearest to the touch position. Here, an exemplary process specifically performed to determine a nearest key and a peripheral key will be described later.

When the control unit 110 determines the key nearest to the touch position and the peripheral key, the control unit 110 changes the mode of displaying the determined nearest key and peripheral key (step S14). For example, the display color of the nearest key and the peripheral key is changed. By thus changing the mode of displaying the nearest key and the peripheral key, an effect is visually applied to the nearest key and the peripheral key.

Next, the control unit 110 reads from the memory 150 word conversion candidates including characters assigned as the head characters to the key nearest to the touch position and the peripheral key, and displays a list of the word conversion candidates on the word conversion candidate display area 220 (step S15).

When the word conversion candidate list is displayed on the word conversion candidate display area 220, the control unit 110 determines whether or not the gesture recognition unit 111 recognizes a word conversion candidate fixing gesture (step S16). The word conversion candidate fixing gesture is a predetermined specific gesture, and the gesture recognition unit 111 detects an input gesture based on the change in the state of a position detected with the touch position detection unit 133.

When an input of the word conversion candidate fixing gesture is detected at step S16, the word conversion candidate display instruction unit 113 fixes word conversion candidates for display to word conversion candidates that are currently displayed on the word conversion candidate display area 220 (step S17). If the input of the word conversion candidate fixing gesture is not detected at step S16, the word conversion candidate display instruction unit 113 does not perform the fixing of the word conversion candidates.

The control unit 110 determines whether or not the gesture recognition unit 111 recognizes a gesture performed to scroll through the word conversion candidates when the word conversion candidate fixing gesture is not detected at step S16 and after the fixing of the word conversion candidates is performed at step S17 (step S18). The word conversion candidate scroll gesture is a predetermined specific gesture, and the gesture recognition unit 111 detects an input gesture based on the change in the state of a position detected with the touch position detection unit 133.

Here, when the gesture recognition unit 111 detects the word conversion candidate scroll gesture, the word conversion candidate display instruction unit 113 scrolls the display of candidate words (step S19). Further, when all the candidates are currently displayed on the word conversion candidate display area 220 in the case where the word conversion candidates are displayed at step S15, the word conversion candidate display instruction unit 113 does not perform scrolling even though the scroll gesture is recognized at step S18.

After that, the control unit 110 determines whether or not an operation is performed to select a word from the word conversion candidates that are displayed on the word conversion candidate display area 220 (step S20). The word selection operation is an operation achieved by, for example, a touch of the display position of any word of the word conversion candidates displayed on the word conversion candidate display area 220.

When it is determined that the word selection operation is performed at step S20, the control unit 110 determines the word conversion for a selected word (step S21). At that time, the control unit 110 displays the determined word at the end of input text which is currently displayed on the text display area 210. Then, a history of selection of the corresponding word is stored in the memory 150.

Further, when it is determined that the word selection operation is not performed at step S20, the control unit 110 determines whether or not the fixing of the word conversion candidate display is performed at step S17 (step S22). Here, when the word conversion candidate fixing is performed, the control unit 110 returns to the determination of step S20. Further, when it is determined that the fixing of the word conversion candidate display is not performed at step S22, the control unit 110 returns to the determination of step S11.

Next, an exemplary process performed with the control unit 110 to determine the key nearest to the touch position and the peripheral key will be described with reference to the flowchart of FIG. 5. The process performed to determine the nearest key and the peripheral key is the process performed with the control unit 110 at step S13 of the flowchart of FIG. 4.

First, the control unit 110 determines the touch position supplied from the touch position detection unit 133 and the near distance supplied from the near distance calculation unit 134 (step S31). Note that, in the state where an object is not in contact with the top face of the display panel 121, a position of the object which is nearest to the display panel 121 represents the touch position. That is, a touch position defined in the non-contact state is a position where a virtual line extended from the end of an approached object in a vertical direction perpendicular to the top face of the display panel 121 and that comes in contact with the top face of the display panel 121. The touch position detection unit 133 detects, for example, a spot where a change in the capacitance is largest as a touch position. Alternatively, the touch position detection unit 133 determines the center position or the barycenter position of an area where the capacitance is changed by as much as a threshold value or more to be a touch position.

Upon determining the touch position, the control unit 110 determines whether or not the determined touch position is in the software keyboard display area 230 (step S32). When the touch position is not in the software keyboard display area 230 at that time, the process performed to determine the nearest key and the peripheral key is finished. When it is determined that the touch position is a position in the software keyboard display area 230, the control unit 110 determines a key displayed at the touch position at that time to be the key nearest to the touch position (step S33).

Next, the control unit 110 virtually sets a circle centered on the touch position obtained at step S31, which corresponds to the near distance at that time, on the software keyboard display area 230 (step S34). The set circle based on the near distance becomes a circle having a radius increased with an increase in the near distance, and a circle having a radius decreased with a decrease in the near distance. More specifically, when the detected near distance is, for example, a largest distance that can be detected with the touch panel unit 130, a circle is provided with a diameter which is slightly larger than the length of a side of a single key displayed on the software keyboard display area 230. Further, when the detected near distance is a distance obtained in the state of being in contact or nearly in contact with the display panel 121, the diameter of the circle becomes smaller than the length of the side of the single key displayed on the software keyboard display area 230. The circle set here is a circle which is virtually set with the control unit 110, and the display panel 121 does not display the circle.

After setting the virtual circle at step S34, the control unit 110 determines whether or not there is a key other than the nearest key in the circle (step S35). When this determination indicates that there is a key other than the nearest key in the circle, the control unit 110 determines the key other than the nearest key, which is within the circle, to be a peripheral key (step S36). Further, when the determination made at step S35 indicates that there is no key other than the nearest key in the circle, the control unit 110 determines that there is no peripheral key (step S37).

The process performed at steps S31 to S37 is performed when the nearest key and the peripheral key are obtained with the control unit 110.

[3. Exemplary Specific Input Operations]

Next, exemplary specific operations and display that are performed at the character input will be described with reference to FIG. 6 to FIG. 9. Any of FIG. 6 to FIG. 9 illustrates an example where the mobile phone terminal device 100 is operating in character input mode. In the character input mode, the control unit 110 controls the display of each of the areas 210, 220, and 230.

Figure 6:
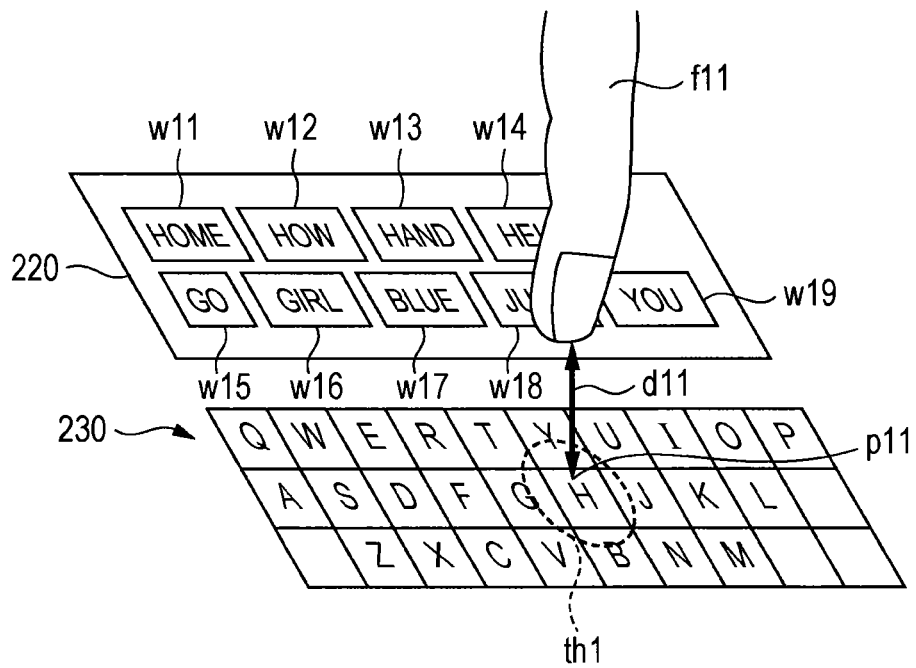
FIG. 6 is a diagram illustrating exemplary display of word conversion candidates (a first example where a finger approaches) according to an embodiment of the present disclosure.

FIG. 6 illustrates an exemplary display performed when a finger approaches above the software keyboard display area 230. In this example, the end of a finger f11 is away from the top face of the display panel 121 by as much as a distance d11. Further, a touch position p11 which is a position where the end of the finger f11 approaches is a key of the letter "H".

Figure 5:
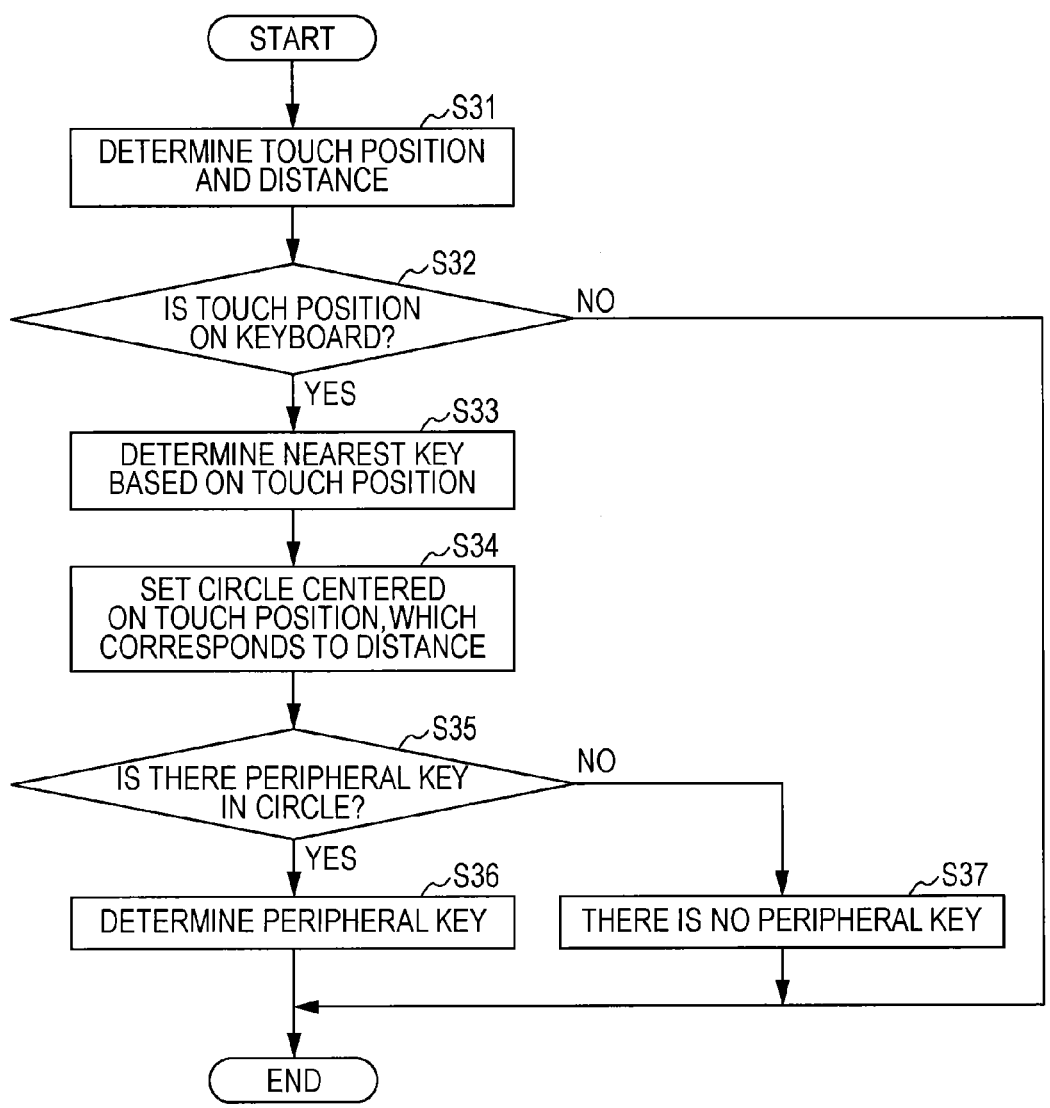
FIG. 5 is a flowchart illustrating an exemplary process of determining a nearest key and a peripheral key according to an embodiment of the present disclosure.

In the state illustrated in FIG. 6, the control unit 110 performs the process illustrated in the flowchart of FIG. 5, and sets a circle th1 centered on the touch position p11 through an operation performed based on the distance d11 from the end of the finger to the panel and the touch position p11. In the example of FIG. 6, the end of the finger f11 is relatively away from the top face of the display panel 121. At that time, the diameter of the circle th1 becomes larger than the length of a side of a key displayed on the software keyboard display area 230.

In the example of FIG. 6, the control unit 110 determines that there are the center key "H", and four keys "Y", "B", "G", and "J" that are vertically and laterally adjacent to the key "H" in an area included in the circle th1. At that time, the center key "H" existing at the touch position p11 becomes a nearest key. Further, the four keys "Y", "B", "G", and "J" that are adjacent to the nearest key "H" become peripheral keys.

Further, in the case of the example of FIG. 6, there are keys "T", "U", and "V" that are provided at the upper left, the upper right, and the lower left of the nearest key "H" in the circle th1. Since the area of each of these three keys "T", "U", and "V", which is included in the circle th1, is considerably small, the keys are handled as keys that are not in the circle th1. These keys are regarded as the keys that are not included in the circle th1 for example, and these keys may be regarded as keys included in the circle th1.

After the nearest key and the peripheral keys are thus determined, the control unit 110 reads word conversion candidates from the memory 150, which include any of the five characters "H", "Y", "B", "G", and "J" that are assigned to the nearest key and the peripheral keys as the head character.

Then, the word conversion candidate display area 220 displays a list of the read word conversion candidates as illustrated in FIG. 6. In the example of FIG. 6, the word conversion candidate display area 220 exemplarily displays nine words including word w11 to word w19. In this example, as many as at least nine word conversion candidates exist, and the word conversion candidate display area 220 displays the words w11 to w19 having first to ninth priorities of the many word conversion candidates. Words having a tenth priority and thereafter are displayed through a scroll operation that will be described later.

In the example of FIG. 6, the following words are displayed.

word w11 . . . home
word w12 . . . how
word w13 . . . hand
word w14 . . . hello
word w15 . . . go
word w16 . . . girl
word w17 . . . blue
word w18 . . . jump
word w19 . . . you Thus, the word conversion candidate display area 220 displays a list of words having "H" as the head characters, words having "G" as the head characters, a word having "B" as the head character, a word having "J" as the head character, and a word having "Y" as the head character. In the example of FIG. 6, the word conversion candidate display area 220 initially displays words having the nearest key "H" as the head characters, and displays words having the peripheral keys "Y", "B", "G", and "J" as the head characters afterward. Further, the word conversion candidate display area 220 displays a relatively large number of word candidates having the nearest key "H" as the head characters, and displays a smaller number of word candidates having the peripheral keys as the head characters. Processing performed to determine the order in which the conversion candidate words are displayed and the number will be described later. Here, the display order and the number of candidates of each character in FIG. 6 are illustrated as an example. For example, words may be displayed in descending order of selection possibility in the state where the head characters are intermingled.

Figure 7:
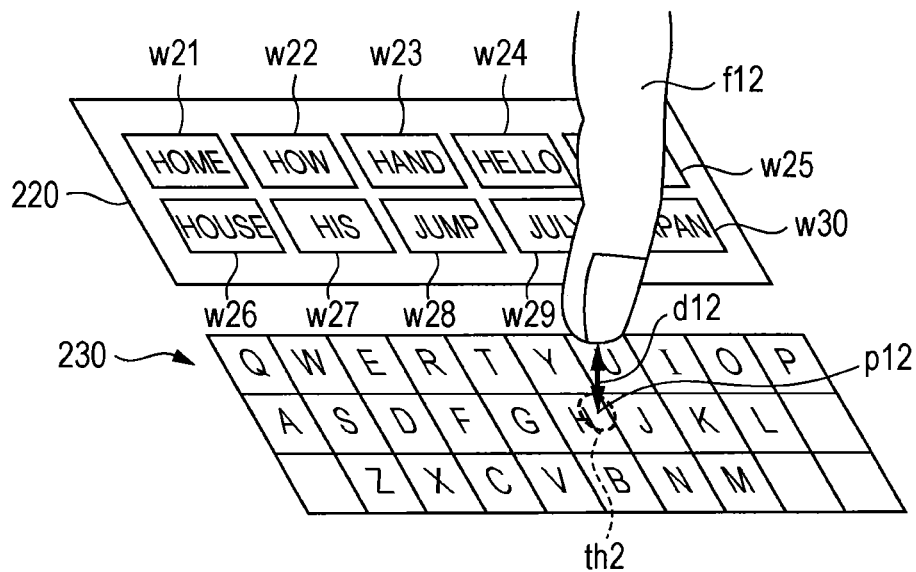
FIG. 7 is a diagram illustrating exemplary display of word conversion candidates (a second example where a finger approaches) according to an embodiment of the present disclosure.

FIG. 7 illustrates exemplary display performed when the end of a finger f12 approaches a position near the top face of the display panel 121 from the state illustrated in FIG. 6. In this case, a touch position p12 is substantially the same position as the touch position p11 illustrated in FIG. 6, and the key of the character "H". An approach distance d12 is shorter than the approach distance d11 illustrated in FIG. 6.

At this time, the control unit 110 sets a circle th2 centered on the touch position p12 through an operation performed based on the distance d12 from the end of the finger to the panel and the touch position p12. In this example, the diameter of the circle th2 becomes shorter than the length of a side of a key displayed on the software keyboard display area 230.

In the state of FIG. 7, the control unit 110 provides the nearest key "H" and a single key "J" which is adjacent to the key "H" on the right side in an area included in the circle th2. Therefore, in the example of FIG. 7, the nearest key "H" and the peripheral key "J" become candidate keys.

The nearest key and the peripheral key are thus determined, which causes the word conversion candidate display area 220 to display a list of the read word conversion candidates, as illustrated in FIG. 7. In the example of FIG. 7, the word conversion candidate display area 220 exemplarily displays ten words including the word w21 to the word w30. In this example also, other word conversion candidates are displayed through the scroll operation that will be described later when there are as many as at least eleven word conversion candidates.

In the example of FIG. 7, the following words are displayed.

word w21 . . . home
word w22 . . . how
word w23 . . . hand
word w24 . . . hello
word w25 . . . he (though hidden by a finger and not seen in FIG. 7)
word w26 . . . house
word w27 . . . his
word w28 . . . jump
word w29 . . . july
word w29 . . . japan Thus, the word conversion candidate display area 220 displays a list of words having "H" as the head characters and words having "J" as the head characters.

In the example of FIG. 7, the nearest key "H" covers a large area and the peripheral key "J" covers a small area in the circle th2. Accordingly, the word conversion candidate display area 220 displays a larger number of words having the nearest key "H" as the head characters than those having "J" as the head characters.

Thus, word conversion candidates that are displayed on the word conversion candidate display area 220 are appropriately determined in accordance with the position and the approach distance of a finger operating the touch panel. Then, as the finger operated by a user approaches the display panel 121, the keys of characters that become candidates are narrowed. In the state where a detected approach distance becomes zero and the finger touches the display panel 121, only the nearest key corresponding to the touched position becomes a candidate character, and a word conversion candidate having the character as the head character is displayed.

Thus, the control unit 110 selects the nearest key and the peripheral key as candidates based on the touch position of, for example, a finger to perform the display of an appropriate word conversion candidate. That is, even though a touch position on the keyboard slightly deviates from the position of a key the user originally desires to press, the possibility that the key which is originally desired to be pressed is included in the candidates is increased. Therefore, displayed word conversion candidates display a word the user desires to select with increased possibility, which increases the efficiency attained at the character input.

Figure 4:
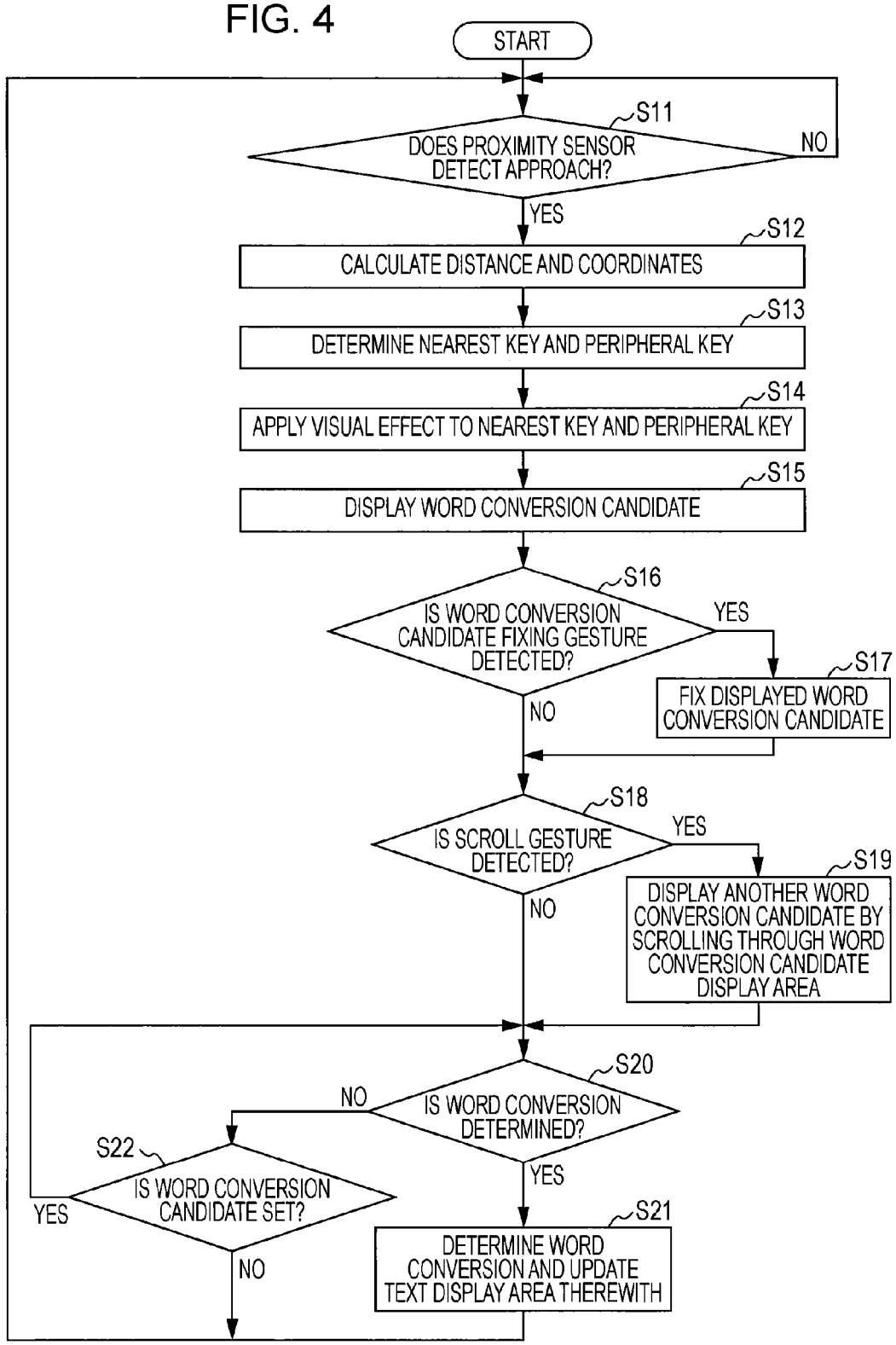
FIG. 4 is a flowchart illustrating an exemplary word conversion candidate display process according to an embodiment of the present disclosure.

Word conversion candidates that are displayed on the word conversion candidate display area 220 are determined to be those currently displayed when the user performs a touch operation to input the specified word conversion candidate fixing gesture as illustrated in steps S16 and S17 of the flowchart of FIG. 4.

Figure 8:
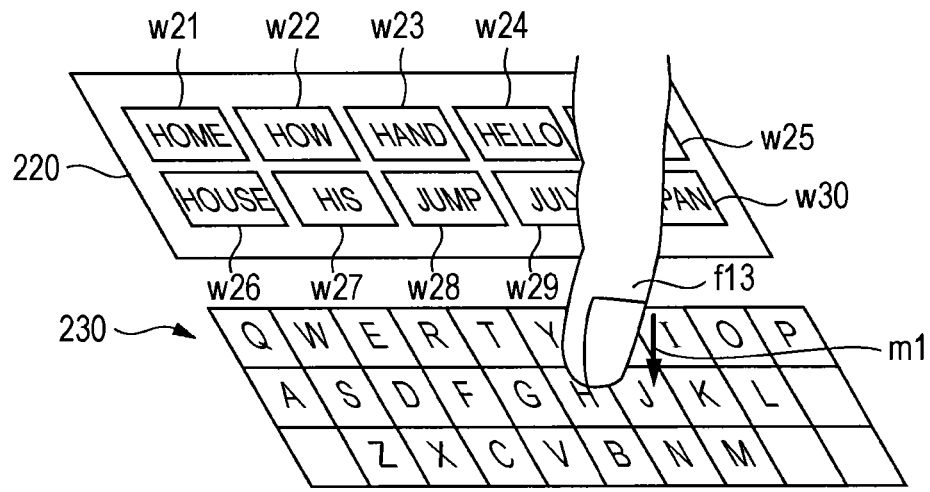
FIG. 8 is a diagram illustrating exemplary display of word conversion candidates (a first example of detecting a fixing gesture) according to an embodiment of the present disclosure.
Figure 9:
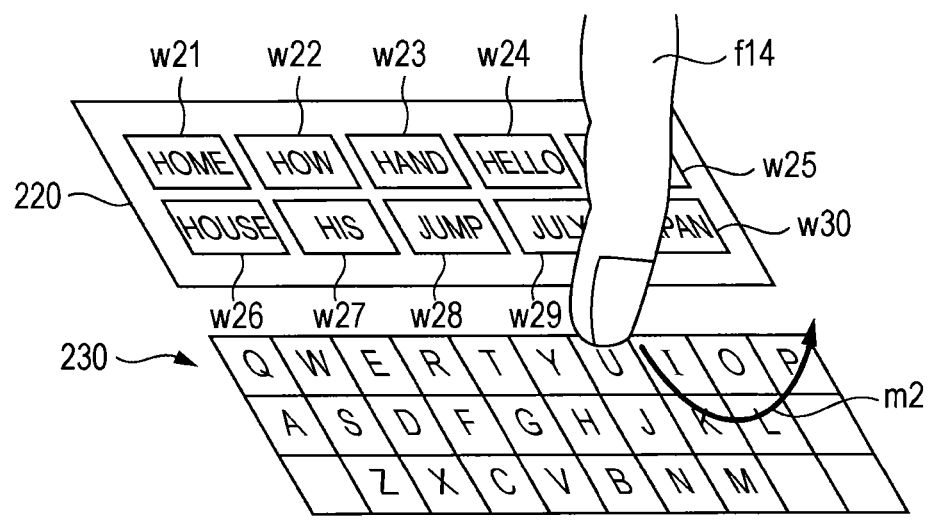
FIG. 9 is a diagram illustrating exemplary display of word conversion candidates (a second example of detecting a fixing gesture) according to an embodiment of the present disclosure.

FIG. 8 and FIG. 9 illustrate individually different examples that are achieved when the word conversion candidate fixing gesture is input.

FIG. 8 illustrates an example where a finger f13 is caused to come in contact with the panel 121 with high speed as indicated by an arrow m1 to input a gesture of pressing the display panel 121. When the gesture recognition unit 111 (FIG. 2) detects the gesture of pressing the display panel 121, a word conversion candidate is fixed to a candidate obtained at the detection.

FIG. 9 illustrates an example where a gesture of moving a finger f14 with high speed as indicated by an arrow m2 to flick the top face of the display panel 121 is input. When the gesture recognition unit 111 detects the gesture of flicking the top face of the display panel 121, a word conversion candidate is fixed to a candidate obtained at the detection time.

Each of the examples of FIG. 8 and FIG. 9 illustrates an example where a gesture is input with high speed, and the word conversion candidate fixing processing is not performed when a finger is moved with a relatively low speed. When the movement of a finger is slow, a key used to select a word conversion candidate is changed, as the transition from the state of FIG. 6 to the state of FIG. 7.

Here, candidates that are fixed in the example of FIG. 8 and the example of FIG. 9 include words that are not displayed on the word conversion candidate display area 220. The words that are not displayed on the word conversion candidate display area 220 are displayed through the scroll operation that will be described below.

[4. Exemplary Scrolling of Word Conversion Candidate Display]

Figure 10:
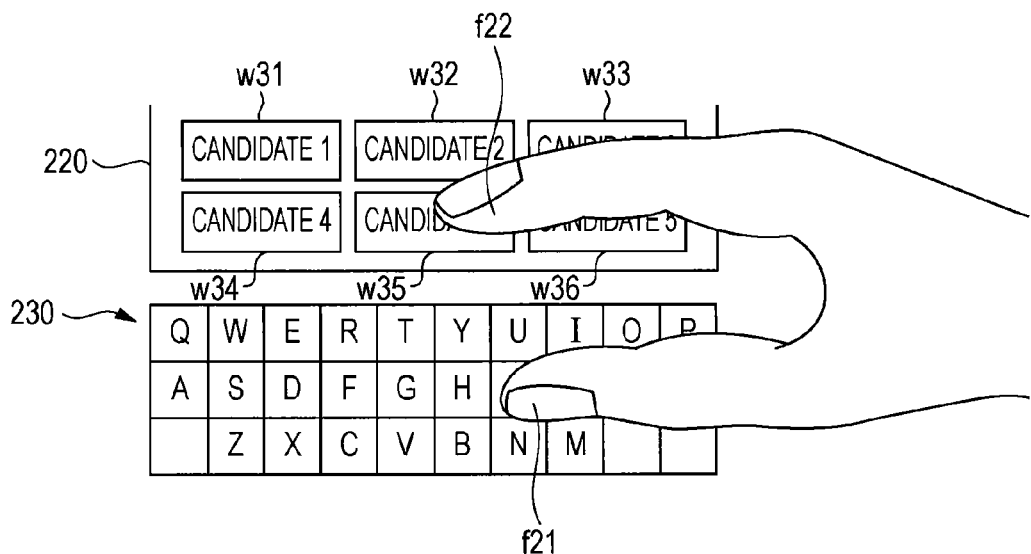
FIG. 10 is a diagram illustrating exemplary display of word conversion candidates (an example where a scroll operation has not been performed) according to an embodiment of the present disclosure.
Figure 11:
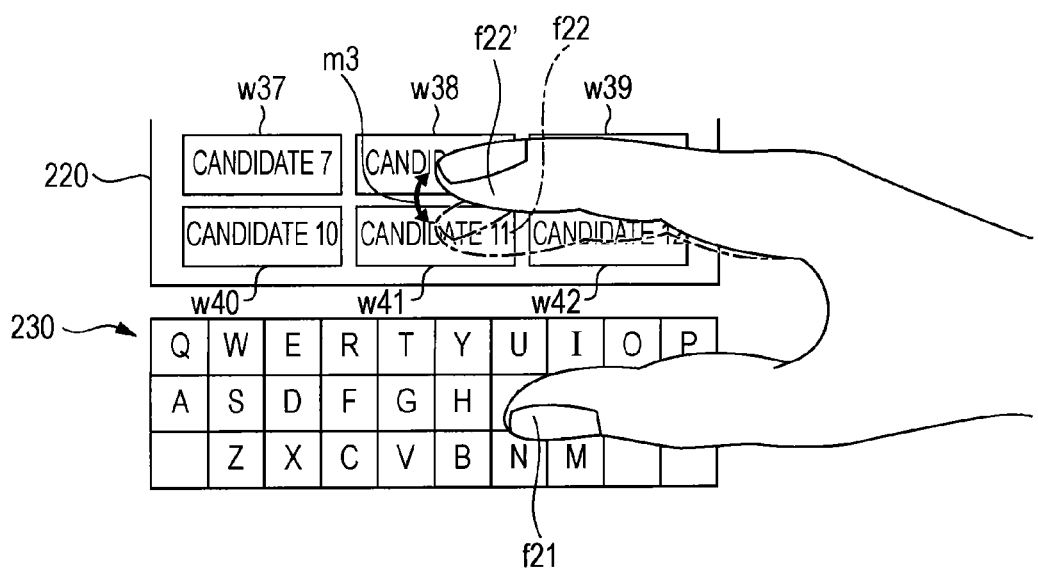
FIG. 11 is a diagram illustrating exemplary display of word conversion candidates (an example where a scroll operation has been performed) according to an embodiment of the present disclosure.

FIG. 10 and FIG. 11 illustrate exemplary scroll operations that are performed to change the display of word conversion candidates that are displayed on the word conversion candidate display area 220.

As illustrated in FIG. 10, the user brings the end of a single finger f21 near the software keyboard display area 230 at the scroll operation. In this manner, the word conversion candidate corresponding to a key provided at a position where the finger f21 is brought near is displayed on the word conversion candidate display area 220, which is so far the same as what has already been described. However, the word conversion candidate display area 220 only displays a displayable number of words on the area 220 of prepared word conversion candidates.

At that time, the user touches the word conversion candidate display area 220 with another finger f22 as illustrated in FIG. 10, and performs a gesture movement m3 referred to as a flick operation performed to upwardly flick a touched finger f22' as illustrated in FIG. 11.

When the gesture recognition unit 111 detects that the upward flicking gesture is input, word conversion candidates that are displayed on the word conversion candidate display area 220 are scrolled upward. In the state of FIG. 10, for example, the word conversion candidate display area 220 displays six words including a word w31 of a candidate 1 to a word w36 of a candidate 6. Then, when there is an input of a scroll gesture illustrated in FIG. 11, the word conversion candidate display area 220 is changed to the display of six words including a word w37 of a candidate 7 to a word w42 of a candidate 12.

Note that, the example of FIG. 11 illustrates the input of the gesture of flicking the top face of the display panel 121 in an upward direction with a finger. On the other hand, when the input of the gesture of flicking the top face of the display panel 121 in a downward direction with a finger is performed, the display of the word conversion candidate display area 220 is changed in the opposite direction. At that time, a word conversion candidate displayed on the word conversion candidate display area 220 becomes a word with the lowest priority of word conversion candidates, for example.

Performing the input of the scroll gesture in that manner enables the word conversion candidate display area 220 to display candidate words in order.

[5. Exemplary Determination of Number of Word Conversion Candidates]

Figure 12:
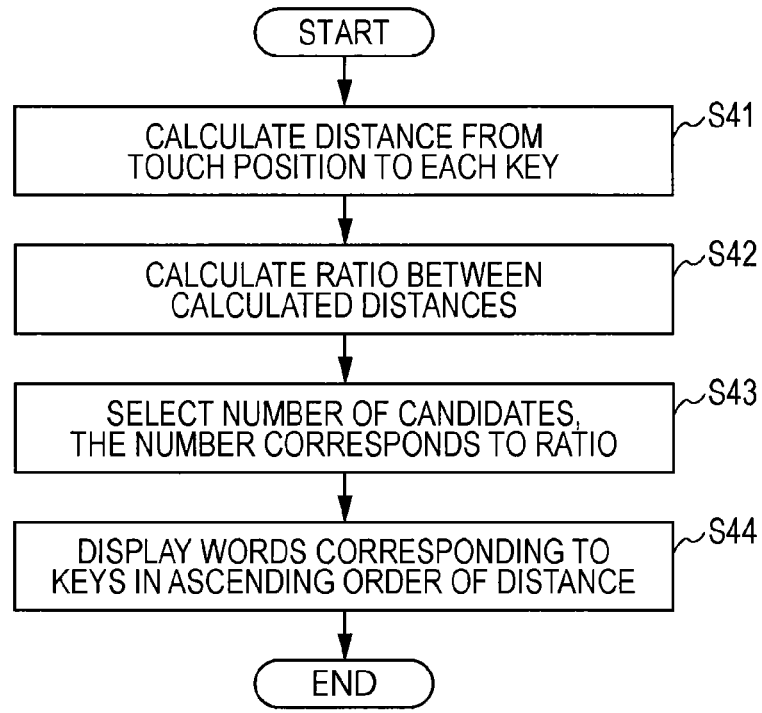
FIG. 12 is a flowchart illustrating an exemplary word conversion candidate selection process according to an embodiment of the present disclosure.

Next, processing performed with the control unit 110 to determine the number of word conversion candidates for display when the word conversion candidate display area 220 displays the word conversion candidates will be described with reference to FIG. 12 and FIG. 13.

The description will be given in accordance with a flowchart of FIG. 12. The control unit 110 calculates the distance from a touch position to the center position of a nearest key, and the distance from the touch position to the center position of a peripheral key (step S41). Next, the control unit 110 calculates the ratio between the respective calculated distances (step S42).

Upon calculating the distance ratio, the control unit 110 determines the number of word conversion candidates including characters assigned to respective keys as the head characters in accordance with the radio (step S43). Processing performed to determine the number in accordance with the ratio is processing performed to select more candidate characters with a decrease in the distance and a fewer candidate characters with an increase in the distance.

Then, the control unit 110 selects respective numbers of conversion candidate words from word conversion candidates that are prepared for characters of the keys, and displays the words on the word conversion candidate display area 220. At this time, the control unit 110 displays the words having the characters corresponding to the keys as the head characters on the word conversion candidate display area 220 in ascending order of the distance from the touch position (step S44). That is, the word conversion candidate display area 220 displays a word having the character corresponding to a key which is short distance from the touch position as the head character at the start, and displays a word having the character corresponding to a key which is long distance from the touch position as the head character at the end.

Then, a specific example where the control unit 110 performs the process of the flowchart of FIG. 12 to determine the number of word conversion candidates based on the ratio between the distances from the touch position to the keys will be described with reference to FIG. 13.

Figure 13:
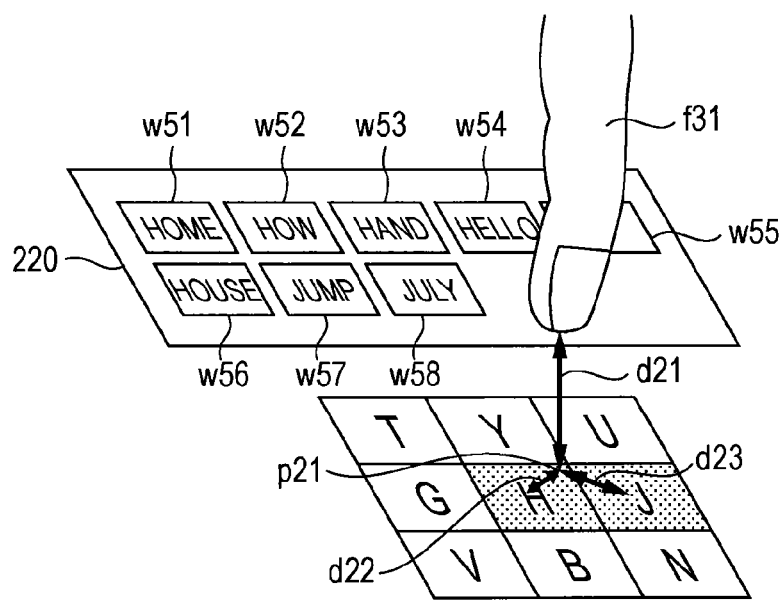
FIG. 13 is a diagram illustrating exemplary display performed through the process of the flowchart of FIG. 12.

In the example of FIG. 13, a touch position p21 of a finger f31 of the user is the position at a key "H", and the control unit 110 determines the key "H" to be the nearest key. Further, the control unit 110 selects a key "J" which is adjacent to the key "H" on the right as a peripheral key based on a distance d21 from the finger f31 to the touch position p21, and the touch position p21. The nearest key and the peripheral key are determined through the process of the flowchart of FIG. 5 which has already been described.

Upon determining the nearest key and the peripheral key, the control unit 110 calculates a distance d22 from the touch position p21 to the center of the nearest key "H", and a distance d23 from the touch position p21 to the center of the peripheral key "J". Then, the control unit 110 calculates the ratio between the calculated distances. In the example of FIG. 13, the distance d22: the distance d23=1:3 holds. At this time, the number of word conversion candidates that are assigned to the nearest key "H" with the short distance becomes three times as large as word conversion candidates that are assigned to the peripheral key "J" with the long distance. That is, the reciprocal 3:1 of the distance ratio 1:3 becomes the ratio between the numbers of words that are assigned to the key "H" and the key "J".

In the example of FIG. 13, the word conversion candidate display area 220 displays eight words w51 to w58. Accordingly, the six words w51 to w56 from the head become the candidate words of a head character "h". Then, the last two words w57 and w58 become the candidate words of a head character "j".

Note that, the display of the word conversion candidate display area 220 may be scrolled and changed to the display of different words as described in FIG. 10 and FIG. 11. When the different words are displayed through scrolling, it is preferable that the word conversion candidate display area 220 displays the candidate words of respective head characters based on a ratio as is the case with FIG. 13.

Further, in the example of FIG. 13, the key "H" and the key "J" that are selected are displayed in a color different from those of other keys. By thus changing the mode of displaying, such as changing display colors of the keys, the user is informed of the nearest key and a peripheral key that are selected based on the position of the finger f31.

Here, FIG. 13 illustrates an example in which a single peripheral key becomes a candidate. On the other hand, even if plural peripheral keys become candidates, the control unit 110 can also determine the number of candidate words that are assigned to the characters corresponding to respective keys based on the distances from the touch position to the keys.

[6. Exemplary Word Conversion Candidates Determined in Accordance with Text]

Figure 14:
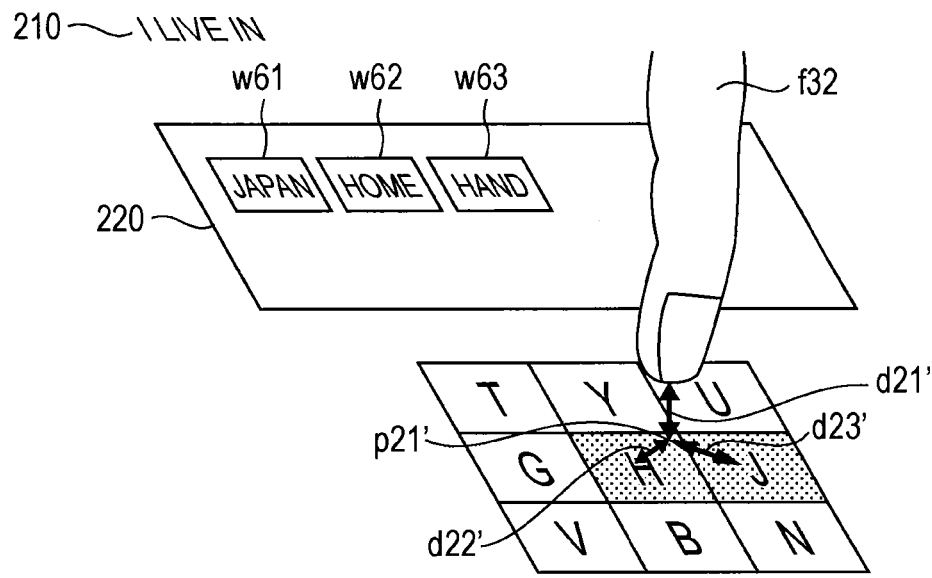
FIG. 14 is a diagram illustrating exemplary display of word conversion candidates (exemplary modification: an example where word conversion candidates are selected based on input text) according to an embodiment of the present disclosure.

FIG. 14 illustrates an example where candidate words are displayed in accordance with text currently being input.

Thus far, it has been described that the candidate words that are displayed on the word conversion candidate display area 220 are exemplarily selected based on the relationship between the touch position, the nearest key, and the peripheral key. On the other hand, when input text is displayed on the text display area 210, the word conversion candidate display area 220 may display at the head a candidate word having a high possibility for being linked to the input text. Here, the input text may be a sentence or a character which is currently being input.

The example of FIG. 14 is an example where a touch position of the finger f31 of the user is a position p21' which is substantially the same as that of the example of FIG. 13. In this case also, a key "H" becomes the nearest key, and a key "J" becomes a peripheral key. In this case, a distance d22' from the touch position p21' to the center of the key "H" and a distance d23' from the touch position p21' to the center of the key "J" are substantially the same as the distances d22 and d23 of the example of FIG. 13, respectively. However, the distance d21' from the finger f31 to the touch position p21' is shorter than the distance d21 of the example of FIG. 13.

Then, in the case of the example of FIG. 14, the text "I live in" which has already been input is displayed on the text display area 210.

In this case, the control unit 110 searches for words having a high possibility for becoming words following "I live in" from among candidate words having "H" as the head characters and candidate words having "J" as the head characters. Here, during the search at that moment, the control unit 110 determines a word with a high frequency of being input in the past through the use of a word input history in the past, for example.

FIG. 14 illustrates an example where the control unit 110 determines that "japan" including "j" as the head character to be a word having a high possibility for being input next time. In this case, the word conversion candidate display area 220 displays a word w61 of "japan" at the start. Then, the word conversion candidate display area 220 displays candidate words w62 and w63 having "H" as the head characters subsequent to the word w61.

By thus displaying the candidate words in accordance with input text, the word conversion candidate display area 220 displays candidate words in more appropriate order than in the case where the order of candidate words is determined based on only the distance from the touch position.

[7. Exemplary Enlargement of Specified Character]

Figure 15:
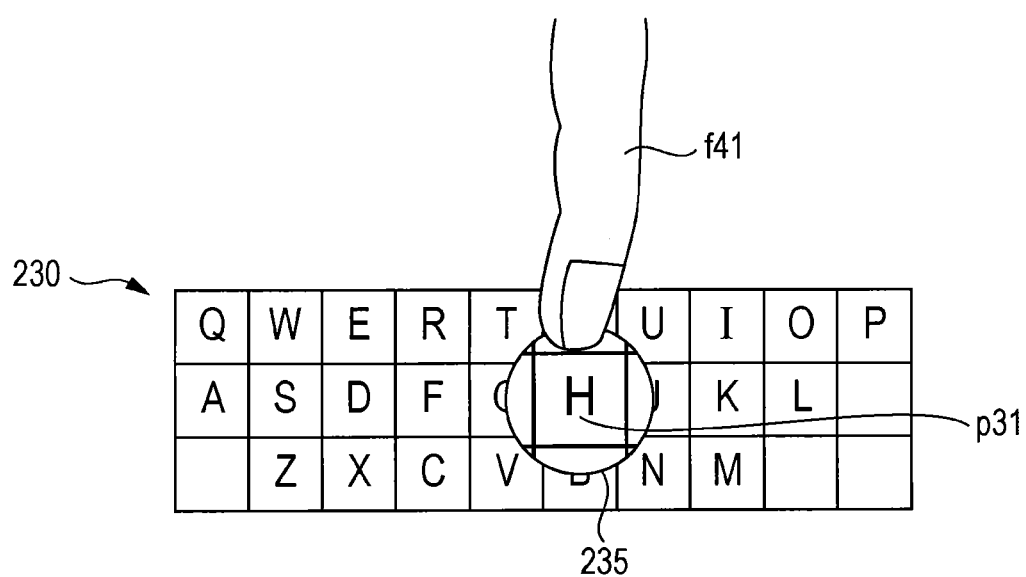
FIG. 15 is a diagram illustrating exemplary display of a keyboard (an example where enlargement is performed) according to an embodiment of the present disclosure.

The software keyboard display area 230 may enlarge and display a key provided near a touch position. That is, when a touch position p31 with a finger f41 of the user is a portion where a key "H" is displayed, an enlarged display area 235 is provided near the key "H", as illustrated in FIG. 15. By thus providing the enlargement display area 235, a key which is currently operated is enlarged and displayed, which allows the user to easily recognize the key, even though many keys are displayed in the software keyboard display area 230 with a relatively narrow pitch.

Note that, the enlarged display may be performed for any of the display examples that are illustrated in FIG. 6 to FIG. 11, etc.

[8. Exemplary Change in Mode of Displaying Candidate Character]

In the case where the nearest key and a peripheral key are determined based on a touch position, the mode of displaying each of the keys may be changed from the mode of displaying other keys, as has been described as illustrated in FIG. 13.

For changing the display mode, further, a display mode for distinguishing between the nearest key and a peripheral key may be provided.

Figures 16, 17:
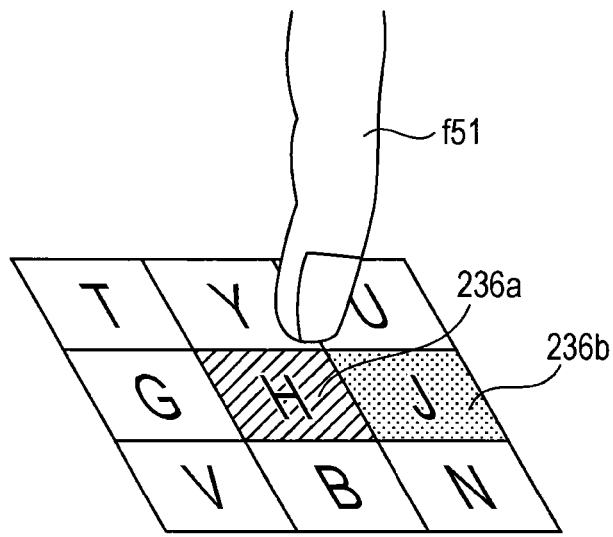
FIG. 16 is a diagram illustrating exemplary display of a keyboard (an example where the mode of displaying a candidate character is changed) according to an embodiment of the present disclosure.
FIG. 17 is a diagram illustrating exemplary display of a keyboard (exemplary Japanese characters) according to an embodiment of the present disclosure.

For example, when a finger f51 is brought near the keyboard, the software keyboard area 230 displays a nearest key 236a determined based on the touch position in a relatively dark color, and displays a peripheral key 236b in a relatively light color, as illustrated in FIG. 16. For other keys, white is used, for example, as a color different from those of the keys 236a and 236b.

Accordingly, the software keyboard display area 230 can appropriately inform the user of keys that are selected as the nearest key and the peripheral key.

[9. Exemplary Display of Japanese Characters]

Thus far, the examples where the software keyboard display area 230 displays the alphabetical keyboard have been described. On the other hand, the application to a keyboard displaying the characters of another language is also possible.

For example, the software keyboard display area 230 may display a Japanese keyboard 330, as illustrated in FIG. 17.

Since the Japanese keyboard 330 includes many characters to be input, the control unit 110 assigns many characters to each of ten displayed keys. The Japanese keyboard 330 including the ten keys has the key arrangement which is mainly applied to a mobile phone terminal.

Figure 18:
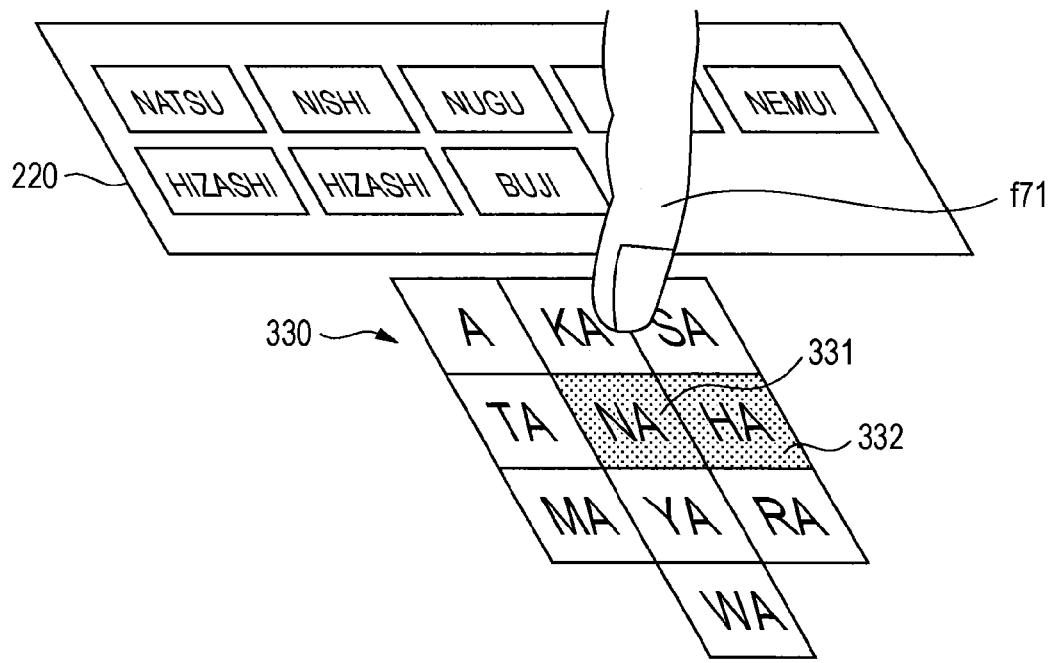
FIG. 18 is a diagram illustrating exemplary word conversion candidate display (an example of the keyboard of FIG. 17) according to an embodiment of the present disclosure.

In the state where the keyboard 330 is displayed, a touch position with a finger f71 of the user is above a specified key 331 of the keyboard 330, for example, as illustrated in FIG. 18. At that time, the key 331 becomes the nearest key. Further, in the example of FIG. 18, a key 332 which is adjacent to the key 331 on the right is determined to be a peripheral key.

When an operation illustrated in FIG. 18 is performed, candidate words that are displayed on the word conversion candidate display area 220 become words having characters that are assigned to the individual keys 331 and 332 as the head characters. Here, five characters are assigned to each of the keys 331 and 332.

Therefore, in this example, ten characters in total, which includes five characters that are assigned to the key 331 and five characters that are assigned to the key 332, become candidates for the head character. Then, the control unit 110 searches for candidate words including the head characters of the ten candidates.

Accordingly, candidate words that are displayed on the word conversion candidate display area 220 include candidate words that are selected among the head characters of the ten candidates. However, there is a possibility that the number of words that are displayed on the word conversion candidate display area 220 is 10 or less, as in the example of FIG. 18, and it may be arranged that the control unit 110 only selects, as head characters, words having characters with a high possibility of being input.

Figure 19:
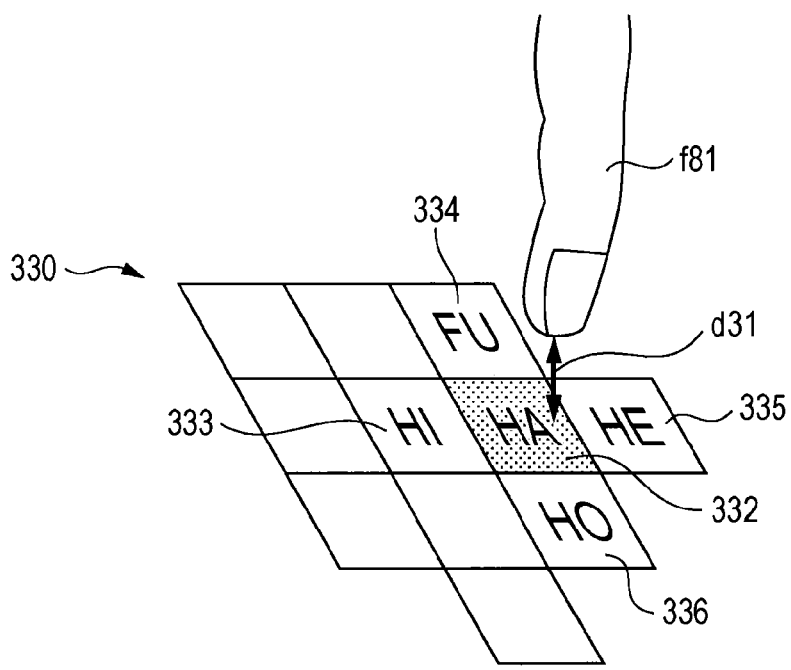
FIG. 19 is a diagram illustrating exemplary word conversion candidate display (an example where a different character is displayed based on the example of FIG. 18) according to an embodiment of the present disclosure.

Further, when the nearest key 332 is determined based on a touch position with a finger f81 of the user, keys 333, 334, 335, and 336 of characters that are assigned to the nearest key 332 may be displayed around the nearest key 332, as illustrated in FIG. 19. The display of the keys 333, 334, 335, and 336 is performed only when the touch position is the key 332, and returns to the basic key display illustrated in FIG. 17, when the finger f81 leaves the keyboard 330.

The display performed with the keyboard 330 allows keys having plural characters that are assigned to individual keys to be dynamically displayed, and increases the operation efficiency achieved when the character input is performed.

[10. Exemplary Modifications]

Each of the examples that have hitherto been described illustrates an appropriate example. For example, for selecting a peripheral key, a virtual circle is set and a key included in the circle is determined to be a peripheral key in the examples of FIG. 6 and FIG. 7. On the other hand, whether or not to include a key as the peripheral key is determined based on conditions such as the distance from a touch position without setting a circle.

Further, in the mobile phone terminal device 100 illustrated in FIG. 1 and FIG. 2, the touch panel unit 130 includes the touch panel 131 detecting capacitance, and the distance from the top face of the touch panel 131 to a finger is detected based on a change in the state of the capacitance. On the other hand, the distance from the top face of the touch panel 131 to a finger may be detected with a sensor different from the touch panel unit. For example, an approach detection sensor detecting an object (finger) which approaches a display panel through the use of ultrasound, infrared radiation, etc. is provided. Then, the control unit 110 may determine an approach distance based on an output from the approach detection sensor.

Further, the word conversion candidate fixing gesture detected at step S16 of the flowchart of FIG. 5 and the scroll gesture detected at step S18 may be gestures other than the examples that are illustrated in FIG. 8 to FIG. 11.

Further, according to examples of the above-described embodiments, the application to a mobile phone terminal device is performed. On the other hand, the application to the character input performed with other terminal devices is also possible. For example, the application to a terminal device including a relatively large touch panel, which is referred to as a tablet terminal, is also possible. Further, a program executing the process illustrated in the flowcharts of FIG. 4, FIG. 5, and FIG. 12 may be generated and the program may be installed in a computer apparatus. In that case, the program is stored in various mediums. Alternatively, a terminal apparatus (computer apparatus) may access a specified server and download the program.

Further, configurations and processing that are disclosed in a claim of the present disclosure are not limited to the examples of the above-described embodiments. It should be understood by those skilled in the art that various modifications, combinations, and other exemplary embodiments may occur depending on design and other factors insofar as they are within the scope of the claim or the equivalents thereof, as a matter of course.

Here, the present disclosure may be configured as below.

(1) An information processing apparatus comprising: a display; a touch panel disposed on or formed integrally with the display that detects a contact input and a contactless input of an object; and a processing unit that determines a position corresponding to an input based on an output from the touch panel; detects a change in distance between a top surface of the touch panel and the object based on the output from the touch panel; and controls the display to display a candidate word list on the display based on the determined position and the detected change in distance.

(2) The information processing apparatus of (1), wherein the processing unit controls the display to display a character input keyboard.

(3) The information processing apparatus of (2), wherein the processing unit identifies at least one key included in the character input keyboard as a candidate input key based on the determined position and the detected change in distance.

(4) The information processing apparatus of (3), wherein the processing unit controls the display to display the candidate word list including candidate words selected based on the identified candidate input key.

(5) The information processing apparatus of any one of (2) to (4), wherein the processing unit identifies a plurality of keys included in the character input keyboard as candidate input keys based on the determined position when an output from the touch panel indicates that the object is greater than a predetermined distance from the touch panel.

(6) The information processing apparatus of (5), wherein the processing unit controls the display to display the candidate word list including candidate words selected based on the identified candidate input keys.

(7) The information processing apparatus of (6), wherein the processing unit identifies the candidate words to be included in the candidate word list by determining a difference in distance between the position of the input and a center portion of each of the plurality of candidate input keys.

(8) The information processing apparatus of (7), wherein the processing unit determines a ratio representing the difference in distance between the position of the input and a center portion of each of the plurality of candidate input keys, and identified the candidate words to be included in the candidate word list based on the ratio.

(9) The information processing apparatus of any one of (6) to (8), wherein the processing unit identifies a single key included in the character input keyboard as a candidate key based on the determined position when an output from the touch panel indicates that the object is in contact with the touch panel.

(10) The information processing apparatus of (9), wherein the processing unit controls the display to display the candidate word list including candidate words selected based on the identified candidate key.

(11) The information processing apparatus of any one of (1) to (10), wherein the processing unit controls the display to scroll the candidate word list when an output from the touch panel indicates that a predetermined gesture input was received at the touch panel.

(12) The information processing apparatus of (11), wherein the predetermined gesture operation is a dragging operation detected at a position corresponding to the displayed candidate word list and the processing unit controls the display to scroll the candidate word list in a direction corresponding to a direction of the dragging operation.

(13) The information processing apparatus of any one of (1) to (12), wherein the processing unit identifies a candidate word displayed in the candidate word list as a selected word when the output of the touch panel indicates that a position of an input detected by the touch panel corresponds to the candidate word and the object is in contact with the touch panel.

(14) The information processing apparatus of any one of (3) to (13), wherein the processing unit controls the display to apply a predetermined effect to the candidate input key so as to differentiate the candidate input key from other keys included in the character input keyboard.

(15) The information processing apparatus of (14), wherein the processing unit controls the display to enlarge the candidate input key in relation to the other keys included in the character input keyboard.

(16) The information processing apparatus of (14), wherein the processing unit controls the display to apply a second predetermined effect to at least one input key located in proximity to the candidate input key so as to differentiate it from the candidate input keys and other keys included in the character input keyboard when an output from the touch panel indicates that the object is greater than a predetermined distance from the touch panel.

(17) The information processing apparatus of any one of (2) to (16), wherein the processing unit controls the display to display a circle on the character input keyboard at a position corresponding to the determined position corresponding to the input.

(18) The information processing apparatus of (17), wherein the processing unit controls the display to display the circle at a first size when the touch input is determined to be a first distance from the touch panel and display the circle at a second size, which is greater than the first size, when the touch input is determined to be a second distance from the touch panel, the second distance being greater than the first distance.

(19) A method performed by an information processing apparatus, the method comprising: detecting, by a touch panel disposed on or formed integrally with a display, a contact input and a contactless input of an object; determining, by a processing unit, a position corresponding to an input based on an output from the touch panel; detecting, by the processing unit, a change in distance between a top surface of the touch panel and the object based on the output from the touch panel; and controlling, by the processing unit, the display to display a candidate word list on the display based on the determined position and the detected change in distance.

(20) A non-transitory computer-readable medium including computer program code, which when executed by an information processing apparatus, causes the information processing apparatus to perform a process, the process comprising: detecting, by a touch panel disposed on or formed integrally with a display, a contact input and a contactless input of an object; determining a position corresponding to an input based on an output from the touch panel; detecting a change in distance between a top surface of the touch panel and the object based on the output from the touch panel; and controlling the display to display a candidate word list on the display based on the determined position and the detected change in distance.

The invention claimed is:

1. An information processing apparatus comprising:
    a display;
    a touch panel disposed on or formed integrally with the display that detects a contact input and a contactless input of an object; and
    circuitry configured to
        determine a position corresponding to an input based on an output from the touch panel;
        detect a distance of a contactless input of the object above a planar top surface of the touch panel based on the output from the touch panel;
        control the display to display a first candidate word list based on the determined position when the detected distance of the contactless input is a first distance; and
        control the display to display a second candidate word list, which is different from the first candidate word list, based on the determined position when the detected distance of the contactless input is a second distance, which is different from the first distance.

2. The information processing apparatus of claim 1, wherein
    the circuitry is configured to control the display to display a character input keyboard.

3. The information processing apparatus of claim 2, wherein
    the circuitry is configured to identify at least one key included in the character input keyboard as a candidate input key based on the determined position and the detected distance.

4. The information processing apparatus of claim 3, wherein
    the circuitry is configured to control the display to display the candidate word list including candidate words selected based on the identified candidate input key.

5. The information processing apparatus of claim 3, wherein
    the circuitry is configured to control the display to apply a predetermined effect to the candidate input key so as to differentiate the candidate input key from other keys included in the character input keyboard.

6. The information processing apparatus of claim 5, wherein
    the circuitry is configured to control the display to enlarge the candidate input key in relation to the other keys included in the character input keyboard.

7. The information processing apparatus of claim 5, wherein
    the circuitry is configured to control the display to apply a second predetermined effect to at least one input key located in proximity to the candidate input key so as to differentiate it from the candidate input keys and other keys included in the character input keyboard when an output from the touch panel indicates that the object is greater than a predetermined distance from the touch panel.

8. The information processing apparatus of claim 2, wherein
    the circuitry is configured to identify a plurality of keys included in the character input keyboard as candidate input keys based on the determined position when an output from the touch panel indicates that the object is greater than a predetermined distance from the touch panel.

9. The information processing apparatus of claim 8, wherein
    the circuitry is configured to control the display to display the candidate word list including candidate words selected based on the identified candidate input keys.

10. The information processing apparatus of claim 9, wherein
    the circuitry is configured to identify the candidate words to be included in the candidate word list by determining a difference in distance between the position of the input and a center portion of each of the plurality of candidate input keys.

11. The information processing apparatus of claim 10, wherein
    the circuitry is configured to determine a ratio representing the difference in distance between the position of the input and a center portion of each of the plurality of candidate input keys, and identify the candidate words to be included in the candidate word list based on the ratio.

12. The information processing apparatus of claim 9, wherein
the circuitry is configured to identify a single key included in the character input keyboard as a candidate key based on the determined position when an output from the touch panel indicates that the object is in contact with the touch panel.

13. The information processing apparatus of claim 12, wherein
the circuitry is configured to control the display to display the candidate word list including candidate words selected based on the identified candidate key.

14. The information processing apparatus of claim 2, wherein
the circuitry is configured to control the display to display a circle on the character input keyboard at a position corresponding to the determined position corresponding to the input.

15. The information processing apparatus of claim 14, wherein
the circuitry is configured to control the display to display the circle at a first size when the contactless input is determined to be a first distance above the planar top surface of the touch panel and display the circle at a second size, which is greater than the first size, when the contactless input is determined to be a second distance above the planar top surface of the touch panel, the second distance being greater than the first distance.

16. The information processing apparatus of claim 1, wherein
the circuitry is configured to control the display to scroll the candidate word list when an output from the touch panel indicates that a predetermined gesture input was received at the touch panel.

17. The information processing apparatus of claim 16, wherein
the predetermined gesture operation is a dragging operation detected at a position corresponding to the displayed candidate word list, and the circuitry is configured to control the display to scroll the candidate word list in a direction corresponding to a direction of the dragging operation.

18. The information processing apparatus of claim 1, wherein
the circuitry is configured to identify a candidate word displayed in the candidate word list as a selected word when the output of the touch panel indicates that a position of an input detected by the touch panel corresponds to the candidate word and the object is in contact with the touch panel.

19. A method performed by an information processing apparatus, the method comprising:
detecting, by a touch panel disposed on or formed integrally with a display, a contact input and a contactless input of an object;
determining, by circuitry, a position corresponding to an input based on an output from the touch panel;
detecting, by the circuitry, a distance of a contactless input of the object above a planar top surface of the touch panel based on the output from the touch panel;
controlling, by the circuitry, the display to display a first candidate word list on the display based on the determined position when the detected distance of the contactless input is a first distance; and
controlling, by the circuitry, the display to display a second candidate word list, which is different from the first candidate word list, based on the determined position when the detected distance of the contactless input is a second distance, which is different from the first distance.

20. A non-transitory computer-readable medium including computer program code, which when executed by an information processing apparatus, causes the information processing apparatus to perform a process, the process comprising:
detecting, by a touch panel disposed on or formed integrally with a display, a contact input and a contactless input of an object;
determining a position corresponding to an input based on an output from the touch panel;
detecting a distance of a contactless input of the object above a planar top surface of the touch panel based on the output from the touch panel;
controlling the display to display a first candidate word list on the display based on the determined position when the detected distance of the contactless input is a first distance; and
controlling the display to display a second candidate word list, which is different from the first candidate word list, based on the determined position when the detected distance of the contactless input is a second distance, which is different from the first distance.

* * * * *